United States Patent
Zhao et al.

(10) Patent No.: US 9,853,280 B2
(45) Date of Patent: Dec. 26, 2017

(54) TERMINAL ASSEMBLY WITH A MULTI-WIRE PLANAR CABLE

(71) Applicants: TYCO ELECTRONICS CORPORATION, Berwyn, PA (US); TYCO ELECTRONICS JAPAN G.K., Kawasaki-shi (JP)

(72) Inventors: Weiping Zhao, Superior Township, MI (US); Hiroki Kondo, Shizuoka (JP)

(73) Assignees: TE CONNECTIVITY CORPORATION, Berwyn, PA (US); TYCO ELECTRONICS JAPAN G.K., Kawasaki-Shi (JP)

( * ) Notice: Subject to any disclaimer, the term of this patent is extended or adjusted under 35 U.S.C. 154(b) by 0 days.

(21) Appl. No.: 15/208,805

(22) Filed: Jul. 13, 2016

(65) Prior Publication Data

US 2017/0279105 A1 Sep. 28, 2017

Related U.S. Application Data

(60) Provisional application No. 62/312,915, filed on Mar. 24, 2016.

(51) Int. Cl.
| | |
|---|---|
| *H01M 2/30* | (2006.01) |
| *H01R 4/02* | (2006.01) |
| *H01R 4/18* | (2006.01) |
| *H01M 10/48* | (2006.01) |
| *H01M 2/22* | (2006.01) |
| *H01M 2/10* | (2006.01) |

(52) U.S. Cl.
CPC ......... *H01M 2/305* (2013.01); *H01M 2/1077* (2013.01); *H01M 2/22* (2013.01); *H01M 10/482* (2013.01); *H01R 4/023* (2013.01); *H01R 4/182* (2013.01); *H01M 2220/20* (2013.01)

(58) Field of Classification Search
CPC ...... H01M 2/305; H01M 2/1077; H01M 2/22; H01M 10/482; H01M 2220/20; H01R 4/182; H01R 4/023
See application file for complete search history.

(56) References Cited

U.S. PATENT DOCUMENTS

| | | |
|---|---|---|
| 4,342,152 A | 8/1982 | Taylor |
| 5,780,774 A | 7/1998 | Ichikawa et al. |
| 6,232,556 B1 | 5/2001 | Daugherty et al. |

(Continued)

FOREIGN PATENT DOCUMENTS

EP 1253684 A2 10/2002

OTHER PUBLICATIONS

International Search Report, International Application No. PCT/IB2017/051639, International Filing Date Mar. 21, 2017.

*Primary Examiner* — Stewart Fraser

(57) ABSTRACT

A terminal assembly includes a multi-wire planar cable having a plurality of flat wires and a common jacket for the plurality of flat wires. The jacket has grooves between adjacent flat wires for controlled separation of the flat wires and surrounding jacket portions at an end of the multi-wire planar cable into separated jacketed wire portions extending a length of the flat wires each including an insulating sleeve and a terminating end of the flat wire. The terminating ends of the flat wires are exposed beyond the insulating sleeves. Terminals are attached to the terminating ends of corresponding flat wires.

20 Claims, 4 Drawing Sheets

(56) References Cited

U.S. PATENT DOCUMENTS

| | | | |
|---|---|---|---|
| 6,656,002 B2 * | 12/2003 | Zhao | H01R 11/22 439/787 |
| 6,945,803 B2 * | 9/2005 | Potega | G01K 1/02 374/E1.002 |
| 7,048,551 B2 * | 5/2006 | Takayama | H01R 4/185 439/67 |
| 8,784,119 B2 | 7/2014 | Tseng et al. | |
| 2007/0093101 A1 | 4/2007 | Kumakura | |
| 2008/0214065 A1 | 9/2008 | Kumakura | |
| 2008/0296044 A1 | 12/2008 | Chiang | |
| 2015/0380836 A1 * | 12/2015 | Ikeda | H01R 12/59 439/422 |

* cited by examiner

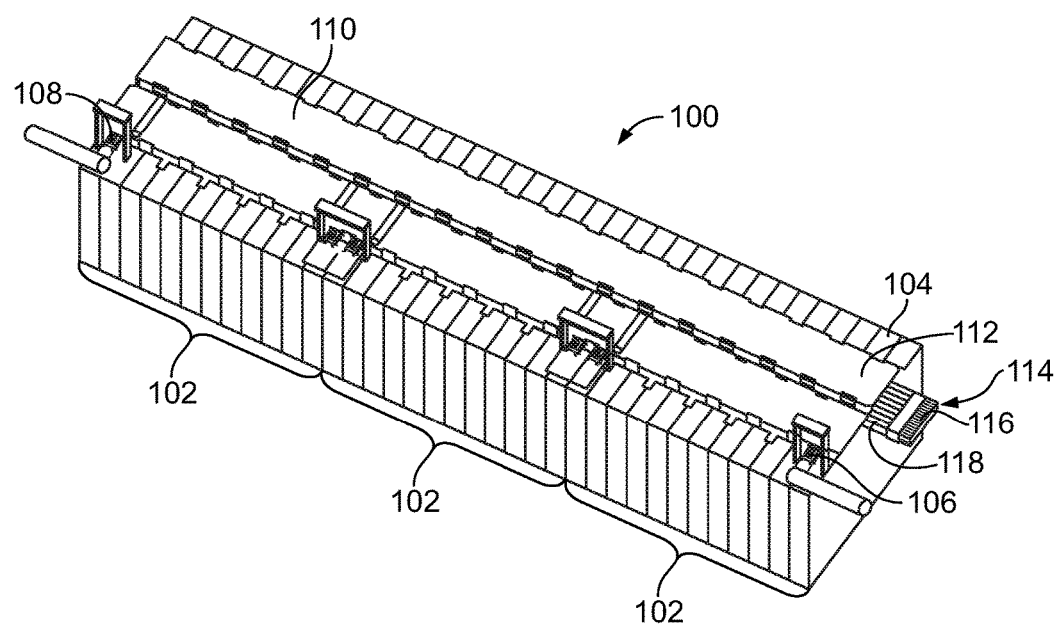
FIG. 1
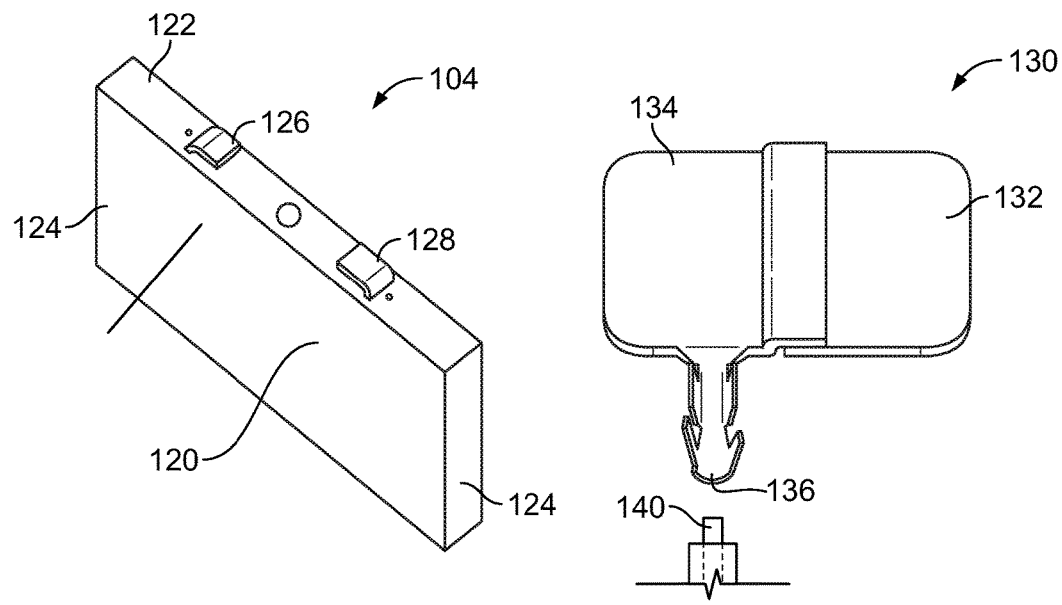
FIG. 2
FIG. 3

TERMINAL ASSEMBLY WITH A MULTI-WIRE PLANAR CABLE

CROSS REFERENCE TO RELATED APPLICATIONS

This application claims the benefit of U.S. Provisional Application No. 62/312,915 filed Mar. 24, 2016 titled BATTERY SYSTEM HAVING A TERMINAL ASSEMBLY WITH A MULTI-WIRE PLANAR CABLE, the subject matter of which is herein incorporated by reference in its entirety.

BACKGROUND OF THE INVENTION

The subject matter herein relates generally to battery connector systems.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. The positive and negative cell terminals are connected using bus bars. Some systems are designed to monitor aspects of the battery cells, such as voltage, temperature and the like. Such systems provide sensors that are connected to a monitoring circuit. However, providing wires between each of the cells or bus bars and the monitoring unit adds bulk to the battery modules.

Some systems use flexible flat cables to reduce the thickness of the wires connecting to the bus bars, which are easy to assembly and avoid chafing wires. However, termination of such flexible flat cables may be difficult as the flat wires of the flexible flat cables need to be routed to different areas of the battery modules. The flat wires are copper conductors having a rectangular cross section. Additionally, even at a central connector where the flexible flat cable is connected to the monitoring system, each of the flat wire needs to be terminated to a different terminal and loaded into a connector. Some conventional systems use pierce crimp terminals that pierce through the flexible flat cable to electrically connect to the flat wires. However, pierce crimp terminals may provide less reliable electrical connections as compared to conventional crimps. Additionally, loading such terminals into a common housing is difficult. Moreover, such assemblies may not meet high voltage creepage distance requirements set by some industries, such as the automotive industry, as separation distances between the terminals may not be great enough. Separation of the flat wires to form individual flat wires to separate the terminals and thus increase the creepage distance is difficult when using regular flexible flat cables. For example, cutting or tearing of the flexible flat cable may result in exposing portions of the flat wires, which could lead to short circuiting or other problems.

A need remains for battery modules that use low cost, flexible flat cables for termination of the flat wires to terminals.

BRIEF DESCRIPTION OF THE INVENTION

In one embodiment, a terminal assembly is provided including a multi-wire planar cable having a plurality of flat wires and a common jacket for the plurality of flat wires. The jacket has grooves between adjacent flat wires for controlled separation of the flat wires and surrounding jacket portions at an end of the multi-wire planar cable into separated jacketed wire portions extending a length of the flat wires each including an insulating sleeve and a terminating end of the flat wire. The terminating ends of the flat wires are exposed beyond the insulating sleeves. Terminals are attached to the terminating ends of corresponding flat wires.

In another embodiment, a connector assembly is provided for connecting to voltage sensors monitoring voltage of battery cells including a connector having a housing extending between a front and a rear. The connector has a plurality of cavities defined by cavity walls. The cavities are open at the rear and being open at the front. The connector assembly includes a terminal assembly having a plurality of terminals received in corresponding cavities through the rear. The terminals have mating ends configured to be mated with mating terminals of a mating connector. The terminals have terminating ends opposite the mating ends. The terminal assembly has a multi-wire planar cable having a plurality of flat wires and a common jacket for the plurality of flat wires. The flat wires are configured to be electrically connected to corresponding voltage sensors of the battery cells. The jacket has grooves between adjacent flat wires for controlled separation of the flat wires and surrounding jacket portions at an end of the multi-wire planar cable into separated jacketed wire portions extending a length of the flat wires each including an insulating sleeve and a terminating end of the flat wire. The terminating ends of the flat wires are exposed beyond the insulating sleeves for termination to the terminating ends of the terminals to electrically connect the terminals to corresponding voltage sensors of the battery cells. The insulating sleeves are at least partially received in the corresponding cavities with the terminals such that the insulating sleeves are separated by the cavity walls.

In a further embodiment, a battery system is provided including a plurality of battery cells forming a battery module, a carrier assembly mounted to the battery module holding a plurality of bus bars for electrically connecting adjacent battery cells of the battery module with voltage sensors sensing a voltage of the corresponding bus bar, and a connector assembly held by the carrier. The connector assembly has a multi-wire planar cable having a plurality of flat wires and a common jacket for the plurality of flat wires. The flat wires are terminated to corresponding voltage sensors and extending to an end of the multi-wire planar cable. The jacket has grooves between adjacent flat wires for controlled separation of the flat wires and surrounding jacket portions at an end of the multi-wire planar cable into separated jacketed wire portions extending a length of the flat wires each including an insulating sleeve and a terminating end of the flat wire. The terminating ends of the flat wires are exposed beyond the insulating sleeves. The connector assembly has a plurality of terminals terminated to corresponding flat wires to electrically connect the terminals to corresponding voltage sensors of the battery cells. The connector assembly has a connector including a housing extending between a front and a rear. The connector has a plurality of cavities defined by cavity walls. The cavities are open at the rear and are open at the front. The cavities receive corresponding terminals and insulating sleeves through the rear such that the terminals and the insulating sleeves are separated by the cavity walls.

BRIEF DESCRIPTION OF THE DRAWINGS

FIG. 1 is a top perspective view of a battery system formed in accordance with an exemplary embodiment.

FIG. 2 is a top perspective view of a battery cell of the battery system formed in accordance with exemplary embodiment.

FIG. 3 is a top perspective view of a buss bar of the battery system formed in accordance with an exemplary embodiment.

DETAILED DESCRIPTION OF THE INVENTION

Figure 4:
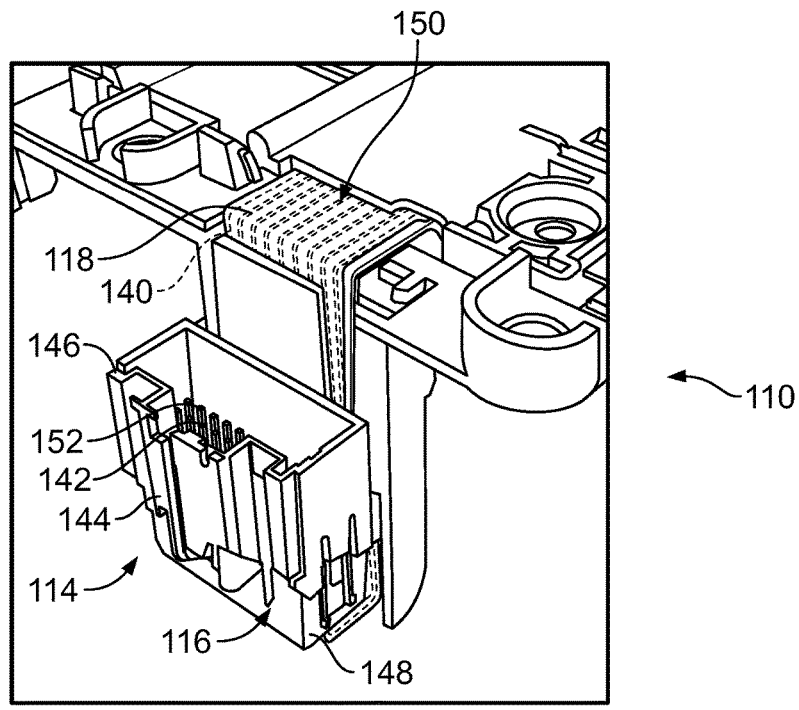
FIG. 4 is a top perspective view of a portion of a carrier assembly of the battery system.

FIG. 1 is a top perspective view of a battery system 100 formed in accordance with an exemplary embodiment. The battery system 100 includes one or more battery modules 102 and a carrier assembly 110 mounted to the battery module(s) 102. The battery modules 102 may be stacked together as a battery pack used as part of the battery system 100, such as a battery system in a vehicle, such as an electric vehicle or a hybrid electrical vehicle. The battery system 100 may be used in other applications in alternative embodiments.

Each battery module 102 includes a plurality of battery cells 104, such as prismatic battery cells. The battery cells 104 are arranged in a stacked configuration, side-by-side, to form the battery module 102. Optional, the battery module 102 may include a case or other housing that holds the battery cells 104. A battery cover may be provided over the tops of the battery cells 104. The battery cover may cover each of the battery cells 104.

Each battery module 102 includes a positive battery terminal 106 and a negative battery terminal 108. The battery terminals 106, 108 are configured to be coupled to external power cables or alternatively may be bussed to battery terminals of another battery module 102. Optionally, the battery terminals 106, 108 may be connected using quick-connection types of connectors.

The carrier assembly 110 includes one or more carrier housings 112 holding a plurality of bus bars 130 (shown in FIG. 3). The bus bars 130 are electrically connected to a battery controller (not shown) that monitors the battery module 102 (e.g., the voltage). and/or control functions associated with the battery module 102. The carrier assembly 110 holds a connector assembly 114 electrically connected to the bus bars 130 and/or a thermistor (not shown).

The connector assembly 114 includes a connector 116 and a multi-wire planar cable 118 terminated to corresponding terminals held in the connector 116. The connector assembly 114 may be electrically connected to the battery controller, such as by a direct connection to the battery controller or by a connection to a wire harness associated with the battery controller. For example, the battery controller or the wire harness may include a mating connector having mating contacts configured to be mated with the connector 116. The connector assembly 114 may be electrically connected to the bus bars 130 to monitor the voltage of the corresponding battery cells 104 of the battery module 102 by measuring the voltage across the buss bar 130 between the associated battery cells 104. For example, the plurality of flat wires of the cable 118 may be electrically connected to corresponding bus bars 130.

FIG. 2 is a top perspective view of one of the battery cells 104 formed in accordance with exemplary embodiment. The battery cell 104 includes a cell housing 120 having a top 122 and side walls 124. In the illustrated embodiment, the cell housing 120 is boxed shaped having four side walls 124.

The battery cell 104 includes a positive cell terminal 126 and a negative cell terminal 128. In the illustrated embodiment, the terminals 126, 128 include flat pads having upper surfaces that define connection interfaces for electrical connection to corresponding bus bars 130 (shown in FIG. 3).

FIG. 3 is a top perspective view of one of the buss bars 130 formed in accordance with an exemplary embodiment. The buss bar 130 is used to electrically connect the cell terminals 126 or 128 (shown in FIG. 2) of adjacent battery cells 104 (shown in FIG. 1).

The buss bar 130 includes a positive plate 132 and a negative plate 134. The positive plate 132 is configured to be terminated to a corresponding positive cell terminal 126 of one battery cell 104 and the negative plate 134 is configured to be terminated to a corresponding negative cell terminal 128 of the adjacent battery cell 104.

The buss bar 130 includes a voltage sensor 136 extending from the negative plate 134. In the illustrated embodiment, the voltage sensor 136 constitutes a crimp barrel configured to receive a flat wire 140 of a voltage sensing system, such as the connector assembly 114 (shown in FIG. 1). Crimping provides a reliable connection with the flat wire 140 for accurate, reliable sensing. Other types of contacts may be provided in alternative embodiments to connect to a corresponding component of the connector assembly 114, such as an insulation displacement contact, a spring contact, a pin, a socket, a poke-in wire connection, a welding pad, and the like. The voltage sensing wire may be affixed to the buss bar 130, such as be welding, soldering, using conductive adhesive, and the like in other alternative embodiments. Optionally, the voltage sensor 136 may be stamped and formed with the bus bar 130. In alternative embodiments, the voltage sensor 136 may be a separate component coupled to the bus bar 130, such as by being soldered, welded, fastened or otherwise secured to the bus bar 130.

FIG. 4 is a top perspective view of a portion of the carrier assembly 110 showing a portion of the connector assembly 114. The connector assembly 114 is used for connecting to the voltage sensors 136 (shown in FIG. 3) and monitoring voltage of the battery cells 104 (shown in FIG. 2). The connector assembly 114 includes the connector 116 provided at the end of the multi-wire planar cable 118. The cable 118 includes a plurality of the flat wires 140, which are connected to corresponding voltage sensors 136, such as at one end, and to corresponding terminals 142, such as at the other end. The flat wires 140 are metal conductors having a rectangular cross-section.

The connector 116 includes a housing 144 holding the terminals 142. The housing 144 extends between a front 146 and a rear 148. The front 146 defines a mating end of the connector 116 configured for mating with the mating connector. The housing 144 may define a cavity or chamber configured to receive the mating connector. The terminals 142 may be exposed within the cavity or chamber for mating with corresponding mating contacts of the mating connector. In other various embodiments, the housing 144 may include a plurality of individual cavities separating the terminals 142. The terminals 142 may be loaded into the housing 144 through the rear 148.

The connector assembly 114 includes a terminal assembly 150. The terminal assembly 150 includes both the multi-wire flat cable 118 and the terminals 142. The terminal assembly 150 may include other terminals provided at the opposite ends of the flat wires 140 for mating with the voltage sensors 136. The terminals 142 have mating ends 152 configured to be mated with corresponding mating terminals of the mating connector. In the illustrated embodiment, the terminals 142 are female terminals having sockets at the mating ends 152; however other types of contacts may be provided at the mating ends 152, such as male contacts having pins, or other types of contacts.

Figure 5:
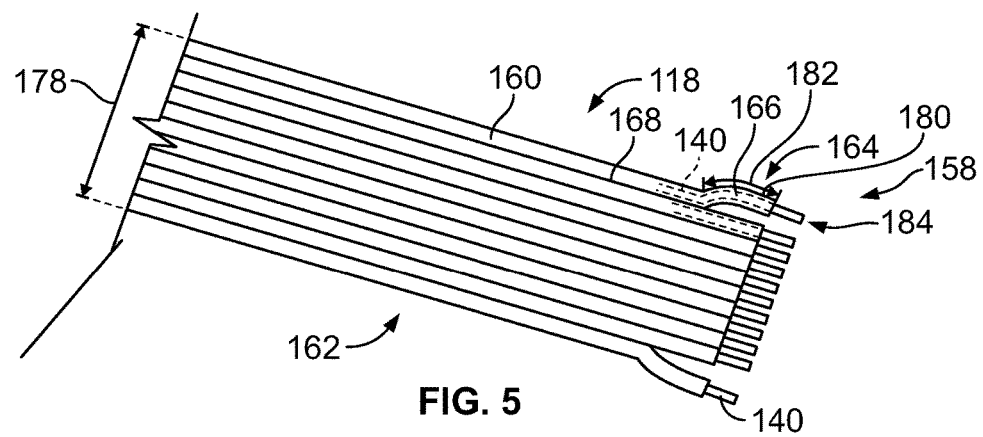
FIG. 5 is a top view of a portion of a multi-wire planar cable for the battery system formed in accordance with an exemplary embodiment.
Figure 6:
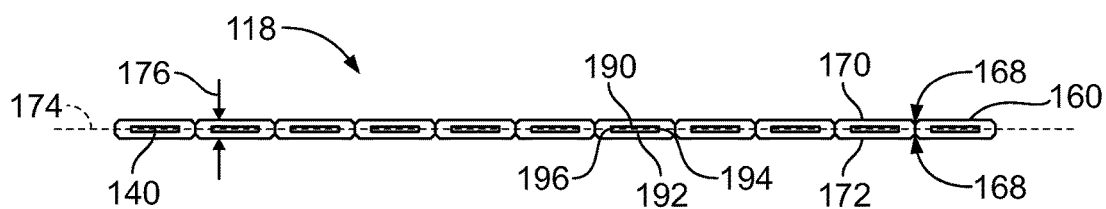
FIG. 6 is a cross-sectional view of the cable shown in FIG. 5.

FIG. 5 is a top view of an end 158 of the multi-wire planar cable 118 in accordance with an exemplary embodiment. FIG. 6 is a cross-sectional view of the cable 118. The cable 118 having a plurality of the flat wires 140 and a common jacket 160 for the plurality of flat wires 140. The cable 118 is flat or planar. The cable 118 is flexible. The cable 118 has the flat wires 140 arranged in a stacked arrangement with the flat wires 140 side-by-side. Each of the flat wires 140 are connected together as a unit by the common jacket 160 in a ribbon portion 162 (FIG. 5) of the cable 118.

The end 158 of the cable 118 may have the flat wires 140 separated from each other for a length at a separation region 164 (FIG. 5) of the cable 118 (only the outer flat wires 140 are shown separated, however any or all of the flat wires 140 may be separated from each other at the separation region 164). For example, the separated portions may be torn or cut to separate portions of the flat wires 140. The separated portions may be referred to as jacketed wire portions 166 of the cable 118 because the flat wires 140 are surrounded by material of the jacket 160. The jacketed wire portions 166 extend forward of the ribbon portion 162 of the cable 118, where the flat wires 140 remain intact and coupled together as a unit. The jacketed wire portions 166 are independently movable relative to each other, such as for termination to the terminals 142 (shown in FIG. 4) and/or for independent loading into the connector 116 (shown in FIG. 4).

In an exemplary embodiment, the jacketed wire portions 166 are separated from adjacent jacketed wire portions 166 at grooves 168 in the jacket 160. The grooves 168 may be centered between adjacent flat wires 140. The grooves 168 may be V-shaped to force separation at the point of the groove 168, such as along the bisector line between the grooves 168. The grooves 168 define boundaries between the flat wires 140 and force separation to occur along the grooves 168. Without the grooves, tearing or cutting may wander away from one flat wire 140 and toward another flat wire 140 leading to some flat wires 140 have more jacketing material and other flat wires 140 having less jacketing material. Without controlled separation, portions of the flat wires 140 may be exposed by the tearing or cutting.

The jacket 160 is insulative and made from a dielectric material, such as polyurethane, polyvinylchloride, chlorinated polyethylene, thermoplastic elastomer, rubber, and the like. The jacket 160 has a top surface 170 and a bottom surface 172 opposite the top surface 170. The top and bottom surfaces 170, 172 are generally planar. A cable plane 174 (FIG. 6) of the cable 118 is defined between the top and bottom surfaces 170, 172. The jacket 160 has a thickness 176 (FIG. 6) between the top and bottom surfaces 170, 172. The thickness 176 may be reduced at the grooves 168. For example, the thickness 176 may be reduced by approximately 30%, by approximately 50%, or more at the grooves 168. Optionally, the grooves 168 may be provided on both the top surface 170 and the bottom surface 172; however the grooves 168 may be provided on only the top surface 170 or the bottom surface 172 in alternative embodiments. The grooves 168 may be aligned with each other across the cable 118 in an exemplary embodiment. The thickness 176 is relatively small compared to a length and a width 178 (FIG. 5) of the cable 118. The width 178 is determined by the number of flat wires 140 and the spacing between the flat wires 140, which is based on the pitch (e.g., horizontal centerline spacing between the flat wires 140) of the flat wires 140 and the width of the individual flat wires 140 as well as the amount of jacket material between the flat wires 140. In an exemplary embodiment, the flat wires 140 may have a 2.54 mm pitch; however the flat wires 140 may have other pitches in alternative embodiments.

At the separation region 164, insulating sleeves 180 (FIG. 5) surround the flat wires 140. The insulating sleeves 180 are the separated portions of the jacket that surround the flat wires 140. The insulating sleeves 180 extend a length 182 of the flat wires 140 to the ribbon portion 162, which is rearward of the separation region 164. Terminating ends 184 of the flat wires 140 are exposed beyond or forward of the insulating sleeves 180 for termination to the terminals 142.

The flat wires 140 have an upper flat side 190, a lower flat side 192 and opposite first and second edges 194, 196 between the flat sides 190, 192. The insulating sleeves 180 surround the sides 190, 192 and the edges 194, 196 to ensure that no portion of the flat wires 140 are exposed, which could lead to a short circuit or arcing.

Figure 7:
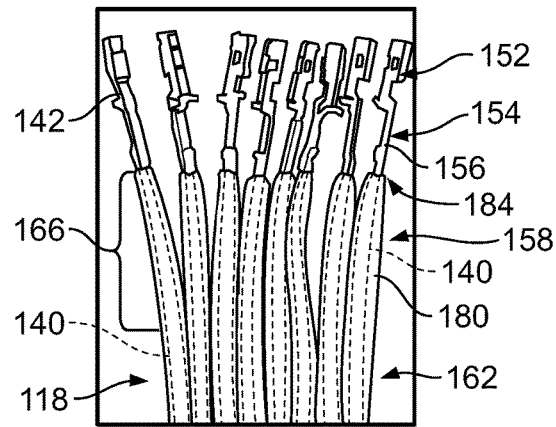
FIG. 7 is a top view of an end of the multi-wire planar cable in accordance with an exemplary embodiment showing separated wires terminated to terminals.

FIG. 7 is a top view of the end 158 of the multi-wire planar cable 118 in accordance with an exemplary embodiment showing the separated wires 140 terminated to terminals 142. In the illustrated embodiment, the terminals 142 are female terminals having sockets; however other types of terminals may be used in alternative embodiments. The jacketed wire portions 166 are shown forward of the ribbon portion 162 of the cable 118. The jacketed wire portions 166 are independently movable relative to each other, such as for loading the jacketed wire portions 166 into the terminals 142 and/or loading the crimped terminals 142 into the connector 116 (shown in FIG. 4). The jacketed wire portions 166 may be twisted or otherwise manipulated for loading into the terminals 142 and/or loading the crimped terminals 142 into the connector 116.

The terminal 142 includes the mating end 152 and a terminating end 154 opposite the mating end 152. In an exemplary embodiment, the terminal 142 includes a crimp barrel 156 at the terminating end 154 configured to be F-crimped to the terminating end 184 of the wire 140 and may be F-crimped to the insulating sleeve 180, such as for strain relief. The crimp barrel 156 is an open barrel designed to receive the terminating end 184 and may be crimped by a machine or tool to the wire 140 and the insulating sleeve 180. The F-crimp is solderless electrical crimp connection.

Figure 8:
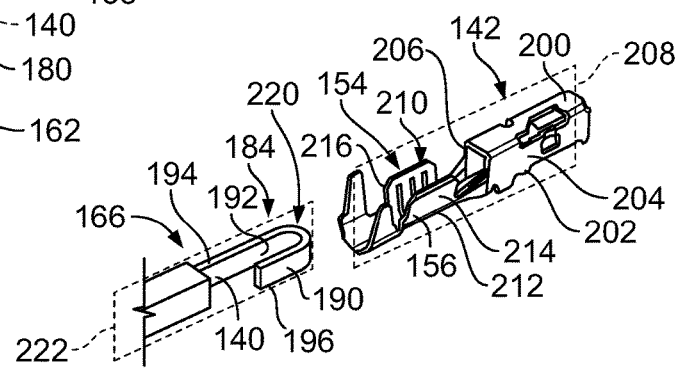
FIG. 8 is a top perspective view of a jacketed wire portion of the cable poised for loading into an open crimp barrel of the terminal.

FIG. 8 is a top perspective view of one of the jacketed wire portions 166 poised for loading into the open crimp barrel 156 of the terminal 142. The terminal 142 has a top 200 and a bottom 202 with sides 204, 206 extending between the top 200 and the bottom 202. The terminal 142 has a terminal plane 208 extending along the longitudinal or mating axis of the terminal and passing through the top 200 and the bottom 202 (e.g., parallel to the sides 204, 206). The terminal 142 must be loaded into the connector 116 with the terminal plane 208 in a particular orientation (e.g., based on the size and/or shape of the cavity receiving the terminal 142 and/or for proper mating with the mating terminal.

The crimp barrel 156 includes an open end 210, a closed end 212 and first and second side walls 214, 216 therebetween. Optionally, the side walls 214, 216 may be angled outward away from each other from the closed end 212. In the illustrated embodiment, the open end 210 is at or faces the top 200 of the terminal 142 and the closed end 212 is at or faces the bottom 202 of the terminal 142. The side walls 214, 216 of the crimp barrel 156 are folded over and pressed against the terminating end 184 of the wire during the F-crimping operation.

In an exemplary embodiment, the terminating end 158 of the flat wire 140 is folded over to form a double layer portion 220 configured to be received in the crimp barrel 156. The double layer portion 220 doubles the amount of metal material of the wire 140 received in the crimp barrel 156, which may form a better crimp during the F-crimping operation. In an exemplary embodiment, the double layer portion 220 is received in the crimp barrel 156 such that edges 194, 196 of the flat wire 140 face the open end 210 and the closed end 212, respectively, and such that flat sides 190 or 192 face the side walls 214, 216 before being F-crimped. For example, when folded over, the upper flat side 190 may face both the side walls 214, 216, while the lower flat side 192 is folded over and faces itself. Alternatively, when folded over, the lower flat side 192 may face both the side walls 214, 216, while the upper flat side 190 is folded over and faces itself.

The double layer portion 220 is received in the crimp barrel 156 such that a flat wire plane 222, defined along a central plane of the flat wire 140, of the flat wire 140 at the terminating end 184 is oriented parallel to the terminal plane 208. For example, both planes 208, 222 are oriented vertically, which may be different than the cable plane 174 (shown in FIG. 5). For example, the flat wire plane 222 may be approximately 90° with respect to the cable plane 174; however the flat wire plane 222 may be at other angles, such as 45° with respect to the cable plane 174 and may even be at 0° with respect to, and thus parallel to, the cable plane 174. The jacketed wire portion 166 may be twisted to orient the flat wire plane 222 non-parallel to the cable plane 174.

Figure 9:
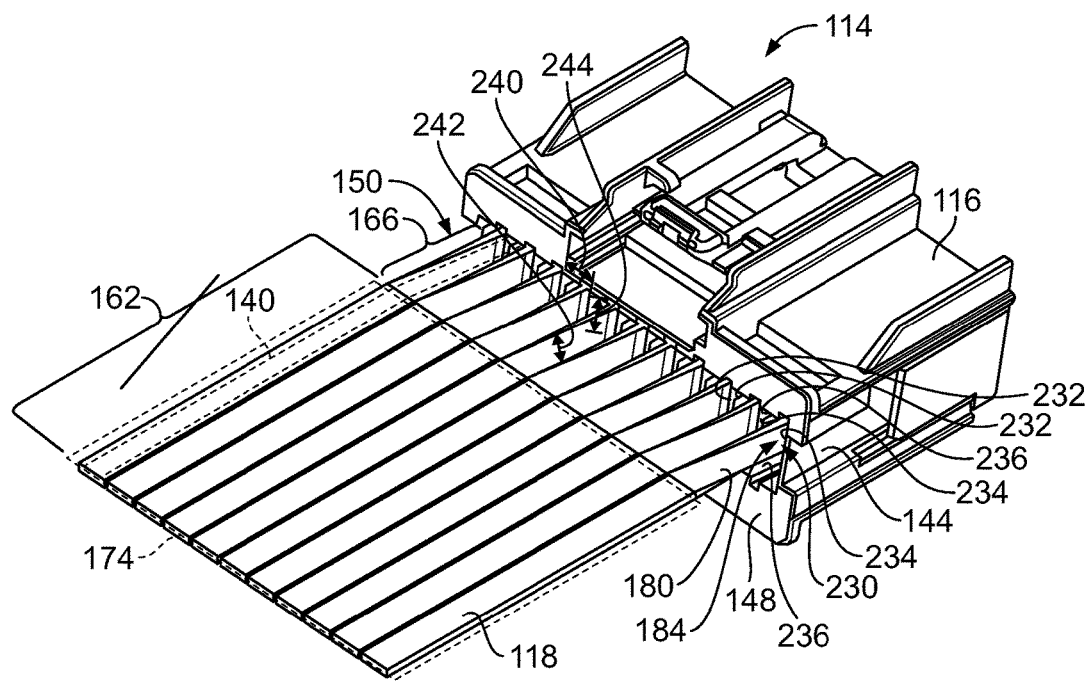
FIG. 9 is a rear perspective view of a connector assembly of the battery system showing a terminal assembly loaded into a connector.

FIG. 9 is a rear perspective view of the connector assembly 114 showing the terminal assembly 150 loaded into the connector 116. The housing 144 of the connector 116 includes individual cavities 230 at the rear 148 that are defined by cavity walls 232. In an exemplary embodiment, the cavity walls 232 include side cavity walls 234 and end cavity walls 236. The side cavity walls 234 are located between adjacent cavities 230. The end cavity walls 236 are at the top and the bottom of the cavities 230. In an exemplary embodiment, the side cavity walls 234 may be longer than the end cavity walls 236. Having shorter end cavity walls 236 may reduce an overall width of the connector 116. The lengths of the end cavity walls 236 may correlate to a spacing or pitch of the cavities 230 and thus a spacing or pitch that the terminals 142 are held at for mating with the mating connector. For example, the pitch between the terminals 142 may be a 2.54 mm centerline spacing; however other pitches narrower or wider are possible in alternative embodiments and depend on the particular application.

The terminals 142 (shown in FIG. 8) and the jacketed wire portions 166 of the cable 118 are loaded into the individual cavities 230 and are separated by the cavity walls 232. The cavity walls 232 increase the creepage distance between the adjacent terminals 142 inserted into adjacent cavities 230, which may reduce a risk of arcing and/or short circuiting. In some embodiments, a width 240 of the cavity between the side cavity walls 234 may be narrower than a width 242 of the insulating sleeves 180 of the jacketed wire portions 166. As such, the jacketed wire portions 166 will not fit widthwise, or horizontally, in the cavities 230. However, a width 244 of the cavity between the end cavity walls 236 may be wider than the width 242 of the insulating sleeves 180 allowing the insulating sleeves 180 to be oriented vertically in the cavities 230. In other various embodiments, the width 242 of the insulating sleeves 180 may be wider than the width 240 of the side cavity walls 234 requiring the insulating sleeves 180 to be oriented transversely within the cavities 230, such as angled at approximately 45° angle or corner-to-corner within the cavities 230; however the insulating sleeves 180 may be oriented at any angle to ease insertion in the cavities 230.

During assembly, the terminals 142, in some embodiments, will be loaded into the cavities 230 in a particular orientation. For example, the top 200 (shown in FIG. 8) may face the upper end cavity wall 236 and the bottom 202 (shown in FIG. 8) may face the lower end cavity wall 236. The sides 204, 206 (shown in FIG. 8) may face the side cavity walls 234. The terminal plane 208 (shown in FIG. 8) may be oriented vertically. In the embodiment where the wire 140 is loaded vertically in the crimp barrel 156 (shown in FIG. 8), such orientation of the terminal 142 in the cavity 230 orients the wire 140 and associated insulating sleeve 180 vertically. As the jacketed wire portion 166 exits the rear 148 of the housing 144, the jacketed wire portion 166 begins to twist to align with the cable plane 174 of the ribbon portion 162. Optionally, the flat wire 140 and the insulating sleeve 180 may be twisted approximately 90°. In other embodiments, the flat wire 140 and the insulating sleeve 180 may be twisted at a different angle, such as approximately 45°. The flat wire 140 at the terminating end 184 and the corresponding insulating sleeve 180 are twisted such that the flat wire plane 222 of the terminating end 184 is angled non-parallel to the flat wire plane 222 of the flat wire 140 rearward of the insulating sleeve 180, such as in the ribbon portion 162.

Figure 10:
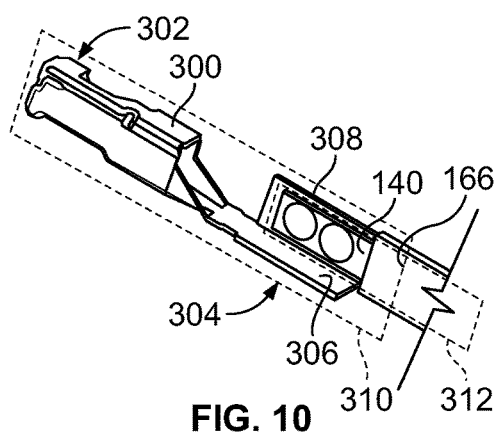
FIG. 10 is a top perspective view of a terminal formed in accordance with an exemplary embodiment and corresponding jacketed wire portion terminated thereto.

FIG. 10 is a top perspective view of a terminal 300 formed in accordance with an exemplary embodiment and the corresponding jacketed wire portion 166 terminated thereto. The terminal 300 includes a mating end 302 and a terminating end 304. The mating end 302 may be identical to the mating end 152 of the terminal 142 (shown in FIG. 8). The terminating end 304 includes a base 306 and a weld tab 308 extending from the base 306. In alternative embodiments, the base 306 may define the weld tab 308. In the illustrated embodiment, the weld tab 308 is bent approximately 90° relative to the base 306; however the weld tab 308 may be at any angle. In various embodiments, the base 306 may be oriented horizontally while the weld tab 308 is oriented vertically. The base 306 may be provided at the bottom of the terminal 300 while the weld tab 308 extends along a side of the terminal 300. Other orientations are possible in alternative embodiments.

The flat wire 140 may be terminated to the weld tab 308 by welding the flat wire 140 to the weld tab 308. For example, the flat wire 140 may be resist welded to the weld tab 308. In other various embodiments, the flat wire 140 may be ultrasonically welded, laser welded or otherwise permanently mechanically and electrically welded to the weld tab 308.

As noted above, the terminal 300 may be configured to be loaded into the connector 116 (shown in FIG. 9) in a particular orientation. For example, a terminal plane 310 of the terminal 300 may be oriented vertically. The weld tab 308 may have a particular orientation relative to the terminal plane 310 to orient a flat wire plane 312 of the jacketed wire portion 166 in a particular orientation relative to the connector 116. For example, the weld tab 308 may be orientated parallel to the terminal plane 310. The weld tab 308 may have other orientations in alternative embodiments, such as at approximately 45° or at approximately 0° or parallel to the terminal plane 310.

Figure 11:
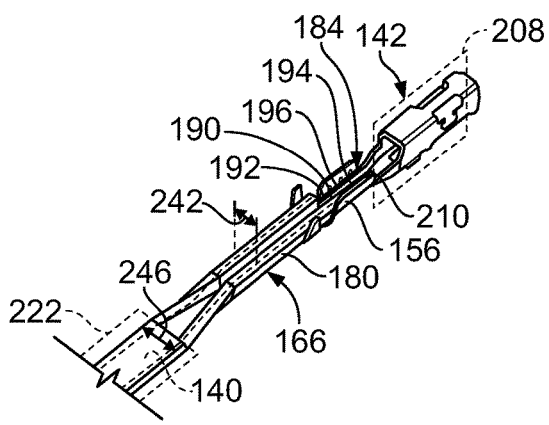
FIG. 11 is a top perspective view of the terminal and corresponding jacketed wire portion in accordance with an exemplary embodiment.
Figure 12:
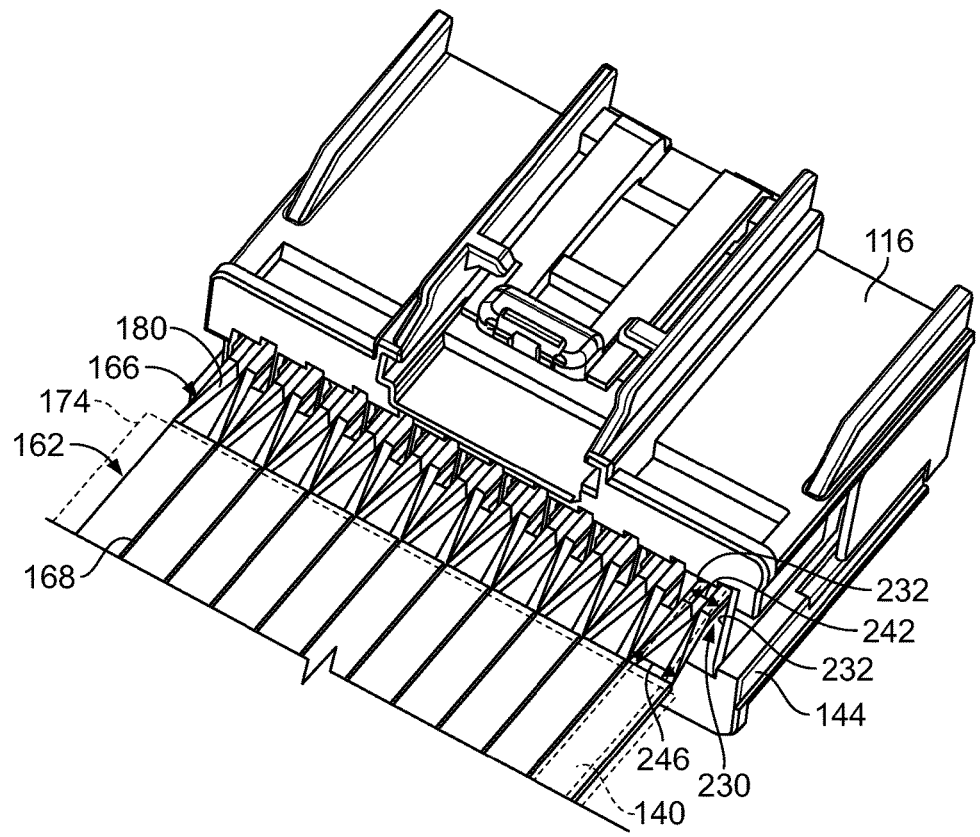
FIG. 12 is a top perspective view of a plurality of terminals loaded into the connector.

FIG. 11 is a top perspective view of the terminal 142 and the corresponding jacketed wire portion 166 in accordance with an exemplary embodiment. FIG. 12 is a top perspective view of a plurality of the terminals 142 loaded into the housing 144 of the connector 116.

The jacketed wire portion 166 is received in the crimp barrel 156. Optionally, the terminal plane 208 may be generally perpendicular to the flat wire plane 222 (FIG. 11) and/or cable plane 174 (FIG. 12). In an exemplary embodiment, the edges 194, 196 of the flat wire 140 are folded up to define a concave shape. Both edges 194, 196 are provided at a top of the flat wire 140. The first flat side 190 is folded inward on itself and faces inward while the second flat side 192 is U-shaped or V-shaped and outward facing. The flat wire 140 may have other shapes in alternative embodiments, such as a W-shape. The terminating end 184 is received in the crimp barrel 156 such that the edges 194, 196 face the open end 210 of the crimp barrel 156 before being F-crimped.

The insulating sleeve 180 is folded over with the flat wire 140 and at least partially received in the crimp barrel 156. The insulating sleeve 180 untwists and flattens out as the insulating sleeve 180 transitions back to the ribbon portion 162. At the folded over region, the width of the flat wire 140 and the corresponding insulating sleeve 180 at the terminating end 184 is smaller than a width 246 of the jacket portion between the grooves 168. By narrowing the jacketed wire portion 166, the flat wire 140 and the insulating sleeve 180 may be able to fit in the narrow cavity 230 of the connector 116. The cavity walls 232 separate the terminals 140 and terminating ends 184 of the flat wires 140 to maintain the creepage distance therebetween the adjacent terminals inserted into adjacent cavities, such as to reduce the risk of arcing.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A terminal assembly comprising:
a multi-wire planar cable having a plurality of flat wires and a common jacket for the plurality of flat wires, the jacket having grooves between adjacent flat wires for controlled separation of the flat wires and surrounding jacket portions at an end of the multi-wire planar cable into separated jacketed wire portions extending a length of the flat wires each including an insulating sleeve and a terminating end of the flat wire, the terminating ends of the flat wires being exposed beyond the insulating sleeves; and
terminals being attached to the terminating ends of corresponding flat wires.

2. The terminal assembly of claim 1, wherein the terminating end of the flat wire is folded over to form a double layer portion, the double layer portion being received in a crimp barrel and crimped the terminal.

3. The terminal assembly of claim 2, wherein the crimp barrel includes an open end, a closed end and side walls therebetween, the double layer portion being received in the crimp barrel such that edges of the flat wire face the open end and the closed end and such that flat sides of the flat wire face the side walls before being crimped.

4. The terminal assembly of claim 1, wherein the terminating end of the flat wire is folded into a concave shape and received in the crimp barrel.

5. The terminal assembly of claim 4, wherein the crimp barrel includes an open end, a closed end and side walls therebetween, the terminating end of the flat wire having an upper flat side, a lower flat side and opposite first and second edges therebetween, the edges being folded up to define the concave shape with both edges being provided at a top of the flat wire, the terminating end being received in the crimp barrel such that the edges face the open end of the crimp barrel before being crimped.

6. The terminal assembly of claim 4, wherein the terminating end of the flat wire and the corresponding insulating sleeve have a width smaller than a width of the jacketed wire portion between the grooves.

7. The terminal assembly of claim 1, wherein the jacket of the cable has a top surface and a bottom surface, the jacket having a thickness defined between the top surface and the bottom surface, the jacket being thinner at the grooves.

8. The terminal assembly of claim 1, wherein the grooves are provided along both a top surface and a bottom surface of the jacket.

9. The terminal assembly of claim 1, wherein each of the insulating sleeves and terminating ends of the flat wires are twisted such that the terminating ends are non-coplanar to each other.

10. The terminal assembly of claim 1, wherein the terminal includes a top and a bottom with a terminal plane passing through the top and the bottom, the terminal being crimped to the terminating end of the flat wire with the terminal plane being parallel to a flat wire plane at the terminating end, the terminal being configured to be received in and held in a connector housing having individual cavities separated by cavity walls with each of the terminal planes being stacked parallel to each other.

11. The terminal assembly of claim 10, wherein the flat wire at the terminating end and the corresponding insulating sleeve are twisted such that the flat wire plane of the terminating end is angled non-parallel to the flat wire plane of the flat wire rearward of the insulating sleeve.

12. The terminal assembly of claim 1, wherein the flat wire at the terminating end and the corresponding insulating sleeve are twisted approximately 90° relative to other portions of the flat wire.

13. The terminal assembly of claim 1, wherein the flat wire at the terminating end and the corresponding insulating sleeve are twisted approximately 45° relative to other portions of the flat wire.

14. A connector assembly for connecting to voltage sensors monitoring voltage of battery cells, the connector assembly comprising:
a connector having a housing extending between a front and a rear, the connector having a plurality of cavities defined by cavity walls, the cavities being open at the rear and being open at the front; and
a terminal assembly having a plurality of terminals received in corresponding cavities through the rear, the terminals having mating ends being configured to be mated with mating terminals of a mating connector, the terminals having terminating ends opposite the mating ends, the terminal assembly having a multi-wire planar cable having a plurality of flat wires and a common jacket for the plurality of flat wires, the flat wires being configured to be electrically connected to corresponding voltage sensors of the battery cells, the jacket having grooves between adjacent flat wires for controlled separation of the flat wires and surrounding jacket portions at an end of the multi-wire planar cable into separated jacketed wire portions extending a length of the flat wires each including an insulating sleeve and a terminating end of the flat wire, the terminating ends of the flat wires being exposed beyond the insulating sleeves for termination to the terminating ends of the terminals to electrically connect the terminals to corresponding voltage sensors of the battery cells, wherein the insulating sleeves are at least partially received in the corresponding cavities with the terminals such that the insulating sleeves are separated by the cavity walls.

15. The connector assembly of claim 14, wherein the cavity walls increase a creepage distance between adjacent terminals with terminating ends of the corresponding flat wires in adjacent cavities.

16. The connector assembly of claim 14, wherein the insulating sleeves exiting the cavities at the rear are twisted to a ribbon portion of the jacket rearward of the separated jacket portions.

17. The connector assembly of claim 14, wherein the terminals includes open crimp barrels, the crimp barrels being F-crimped to the terminating ends of corresponding flat wires.

18. The connector assembly of claim 14, wherein each terminal includes a weld tab oriented perpendicular to a plane of the cable, each terminating end being rotated 90° for welding to the corresponding weld tab.

19. The connector assembly of claim 14, wherein each terminal includes a weld tab oriented perpendicular to a plane of the cable, each terminating end being rotated 45° for welding to the corresponding weld tab.

20. A battery system comprising:
a plurality of battery cells forming a battery module;
a carrier assembly mounted to the battery module, the carrier assembly holding a plurality of bus bars for electrically connecting adjacent battery cells of the battery module, the bus bars having voltage sensors sensing a voltage of the corresponding bus bar; and
a connector assembly held by the carrier, the connector assembly having a multi-wire planar cable having a plurality of flat wires and a common jacket for the plurality of flat wires, the flat wires being terminated to corresponding voltage sensors and extending to an end of the multi-wire planar cable, the jacket having grooves between adjacent flat wires for controlled separation of the flat wires and surrounding jacket portions at an end of the multi-wire planar cable into separated jacketed wire portions extending a length of the flat wires each including an insulating sleeve and a terminating end of the flat wire, the terminating ends of the flat wires being exposed beyond the insulating sleeves, the connector assembly having a plurality of terminals terminated to corresponding flat wires to electrically connect the terminals to corresponding voltage sensors of the battery cells, the connector assembly having a connector including a housing extending between a front and a rear, the connector having a plurality of cavities defined by cavity walls, the cavities being open at the rear and being open at the front, the cavities receiving corresponding terminals and insulating sleeves through the rear such that the terminals and the insulating sleeves are separated by the cavity walls.

* * * * *